(12) United States Patent
Matsas et al.

(10) Patent No.: US 8,666,840 B1
(45) Date of Patent: Mar. 4, 2014

(54) COMPUTER METHODS AND COMPUTER SYSTEMS FOR FACILITATING AUTOMATED SALE TRANSACTIONS BETWEEN BUYERS AND SELLERS OVER THE SALE OF FULLY PRE-SPECIFIED PRODUCTS AND SERVICES

(71) Applicants: Victor Matsas, Athens (GR); Apostolos Tsakpinis, Athens (GR); Ioannis Tsakpinis, Alexandroupolis (GR)

(72) Inventors: Victor Matsas, Athens (GR); Apostolos Tsakpinis, Athens (GR); Ioannis Tsakpinis, Alexandroupolis (GR)

( * ) Notice: Subject to any disclaimer, the term of this patent is extended or adjusted under 35 U.S.C. 154(b) by 0 days.

(21) Appl. No.: 13/773,122

(22) Filed: Feb. 21, 2013

Related U.S. Application Data

(60) Provisional application No. 61/604,920, filed on Feb. 29, 2012.

(51) Int. Cl.
*G06Q 30/00* (2012.01)

(52) U.S. Cl.
USPC .......................................... 705/26.1

(58) Field of Classification Search
USPC ............. 705/26.1, 26.2, 26.25, 26.3, 26.35, 705/26.4, 26.41–26.44, 26.5, 26.61–26.64, 705/26.7, 26.8, 26.81, 26.82, 26.9, 27.1, 705/27.2
See application file for complete search history.

(56) References Cited

U.S. PATENT DOCUMENTS

| | | | | |
|---|---|---|---|---|
| 5,897,620 | A * | 4/1999 | Walker et al. | 705/5 |
| 6,041,308 | A * | 3/2000 | Walker et al. | 705/14.1 |
| 6,085,169 | A * | 7/2000 | Walker et al. | 705/4 |
| 6,119,100 | A * | 9/2000 | Walker et al. | 705/20 |
| 6,134,534 | A * | 10/2000 | Walker et al. | 705/5 |
| 7,620,619 | B1 * | 11/2009 | Walker et al. | 1/1 |
| 7,664,672 | B1 * | 2/2010 | Walker et al. | 705/26.4 |
| 7,801,751 | B2 * | 9/2010 | Walker et al. | 705/5 |
| 2001/0056396 | A1 * | 12/2001 | Goino | 705/37 |
| 2012/0185348 | A1 * | 7/2012 | Milgrom | 705/26.3 |

OTHER PUBLICATIONS

Serguei Netessine et al. "Yield Management", Feb. 1999, revised Feb. 2002.*

\* cited by examiner

*Primary Examiner* — Naeem Haq
(74) *Attorney, Agent, or Firm* — Greenberg Traurig, LLP (57) ABSTRACT

In one embodiment, the instant invention provides for a method that includes the following steps of: programming a computer system to perform the steps of: receiving, from a seller, seller information for an item that the seller offers to sell; determining from the seller information: identifying characteristics that specifically describe the item and specifically identify the seller; Minimum Acceptable Price (MAP) and Minimum Acceptable Price Range (MAPR), and Maximum Allowable Number of Negotiating Chances per each buyer (MANBCs); receiving, from the potential buyer, a buyer offer for the first item and consummating a sale transaction when: a monetary amount or a range of monetary amounts submitted by the buyer respectively matches the MAP or the MAPR, and the potential buyer has not previously submitted an other offer for the item so that a total number of offers made by the potential buyer is equal or less than the MANBCs.

27 Claims, 4 Drawing Sheets

COMPUTER METHODS AND COMPUTER SYSTEMS FOR FACILITATING AUTOMATED SALE TRANSACTIONS BETWEEN BUYERS AND SELLERS OVER THE SALE OF FULLY PRE-SPECIFIED PRODUCTS AND SERVICES

RELATED APPLICATIONS

This application claims the priority of U.S. provisional application Ser. No. 61/604,920, entitled "COMPUTER METHODS AND COMPUTER SYSTEMS FOR FACILITATING AUTOMATED SALE TRANSACTIONS BETWEEN BUYERS AND SELLERS OVER THE SALE OF A FULLY PRE-SPECIFIED PRODUCTS AND SERVICES," filed on Feb. 29, 2012, which is incorporated herein by reference in its entirety for all purposes.

TECHNICAL FIELD

In some embodiments, the instant invention is related to computer methods/systems and computer pricing models for facilitating dynamic transactions between buyers and sellers over the sale of a fully pre-specified products and services.

BACKGROUND

There are many methods by which sellers can sale their products and/or services. One typical method is when sellers advertise a predetermined price for a product/service, and customers pay the advertized price to receive the product/service. Another typical method is when sellers may accept conditional purchase offers (CPOs) from buyers. In some cases, a typical CPO may involve specifying a price that the buyer is willing to pay for the product/service. If a seller accepts the CPO, then that seller gets paid. Even if the buyer later reneges, in some CPOs, there is a payment guarantee that the seller receives appropriate compensation, typically either the full offer price or a predetermined penalty payment. For example, typically, in some CPOs, specific details of a product/service (e.g., Hotel Name and/or specific Room Type, Airline and/or Flight Number etc) are unknown. In some instances, products/service represent excess of perishable inventory such as seats on airline flights or hotel rooms. For example, the marginal cost to an airline of selling an additional seat is extremely low. Accordingly, it can be profitable to sell a seat for a low, buyer-specified offer price, especially if the chance of otherwise selling the seat is small (e.g. soon before the flight departs).

SUMMARY OF THE INVENTION

In some embodiments, the instant invention provides for a computer-implemented method that includes at least the following steps of: programming at least one computer system to perform at least the steps of: receiving, by a computer system, from at least one first seller, first seller information for at least one first item that the at least one first seller offers to sell; determining, by the computer system, from the seller information at least the following conditions for the at least one first item: i) a plurality of first identifying characteristics that specifically describe the at least one first item and specifically identify the at least one first seller; ii) a first Minimum Acceptable Price (a first MAP) that the at least one first seller is willing to accept and a first Minimum Acceptable Price Range (a first MAPR) within which the at least one first seller desires to receive at least one first offer to buy the at least one first item, and iii) a first Maximum Allowable Number of Negotiating Chances (a first MANBCs) per each buyer; displaying, by the computer system, to at least one first potential buyer, on a screen of a computer device, the plurality of first identifying characteristics of the at least one first item and at least one of: i) at least one first option to enter a first monetary amount that the at least one first potential buyer agrees to pay for the at least one first item, or ii) at least one second option to select a first range of monetary amounts that the at least one first potential buyer agrees to pay for the at least one first item; receiving, by the computer system, from the at least one first potential buyer, at least one first buyer offer for the at least one first item; consummating, by the computer system, at least one first sale transaction when: i) the first monetary amount or the first range of monetary amounts of the at least one first buyer offer for the at least one first item respectively matches the first MAP or the first MAPR, and ii) the at least one first potential buyer has not previously submitted at least one other offer for the at least one first item so that a total number of offers made by the at least one first potential buyer is equal or less than the first MANBCs, wherein the total number of offers made by the at least one first potential buyer is a count of the at least one first buyer offer and the at least one other offer that the at least one first potential buyer submitted for the at lest one first item; and enabling, by the computer system, the at least one first potential buyer to submit at least one second buyer offer for the at least one first item when: i) the monetary amount or range of monetary amounts of the at least one first buyer offer for the at least one first item do not respectively match the first MAP or the first MAPR, and ii) the at least one first potential buyer has not previously submitted the at least one other offer for the at least one first item so that the total number of offers made by the at least one first potential buyer is equal or less than the first MANBCs, wherein the total number of offers made by the at least one first potential buyer is a count of the at least one first buyer offer and the at least one other offer that the at least one first potential buyer submitted for the at least one first item.

In some embodiment, the at least one item is at least one first product or at least one first service that the at least one first seller offers to sell.

In some embodiment, the displaying the at least one second option to select the first range of monetary amounts that the at least one first potential buyer agrees to pay for the at least one first item further includes: identifying each range of monetary amounts in a plurality of ranges of monetary amounts based on likelihood that the at least one first seller accepts the at least one first buyer offer or the at least one second buyer offer.

In some embodiment, the displaying the at least one second option to select the first range of monetary amounts that the at least one first potential buyer agrees to pay for the at least one first item further includes: varying a number of displayed ranges in a plurality of ranges of monetary amounts based on at least one monetary fee received from the at least one first potential buyer.

In some embodiment, the computer-implemented method further includes: changing, by the computer system, from the at least one first seller, the first MAPR when the at least on first seller receives no offers that matches the first MAPR after a pre-determine time period.

In some embodiment, the computer-implemented method further includes: varying, by the computer system, a number of the first MANBCs based on at least one monetary fee received from the at least one first potential buyer. In some embodiment, the computer-implemented method further includes: increasing, by the computer system, the at least one monetary fee for buyer offer subsequent to the at least one first buyer offer. In some embodiment, the computer-implemented method further includes: increasing, by the computer system, the at least one monetary fee for buyer offer subsequent to the at least one second buyer offer.

In some embodiment, the at least one first seller is a hotel and the at least one first item is a room in the hotel. In some embodiment, the computer-implemented method further includes: dynamically adjusting, by the computer system, at least one of the first MAP, the first MAPR, and the first MANBCs, based a plurality of:

a) a date of booking;
b) a date of check-in;
c) days ahead of arrival;
d) room availability;
e) allotment booked;
f) occupancy level;
g) a total cost of the at least one first sale transaction;
h) times applied;
i) demand for at least one first identifying characteristic of the room;
j) at least one market characteristics of a market where the at least one first potential buyer is geographically located;
k) customer ID profile of the at least one first potential buyer;
l) at least one calendar date of stay;
m) a date of arrival;
n) a date of departure;
o) a length of stay;
p) a desired number of rooms;
q) a number of guests; and
r) a PAX combinations.

In some embodiments, the instant invention further provides a programmed computer system that includes at least the following parts: a non-transient memory having at least one region for storing computer executable program code; and at least one processor for executing the program code stored in the memory, wherein the program code that at least includes: code to receive, from at least one first seller, first seller information for at least one first item that the at least one first seller offers to sell; code to determine, from the seller information at least the following conditions for the at least one first item: i) a plurality of first identifying characteristics that specifically describe the at least one first item and specifically identify the at least one first seller; ii) a first Minimum Acceptable Price (a first MAP) that the at least one first seller is willing to accept and a first Minimum Acceptable Price Range (a first MAPR) within which the at least one first seller desires to receive at least one first offer to buy the at least one first item, and iii) a first Maximum Allowable Number of Negotiating Chances (a first MANBCs) per each buyer; code to display, to at least one first potential buyer, on a screen of a computer device, the plurality of first identifying characteristics of the at least one first item and at least one of: i) at least one first option to enter a first monetary amount that the at least one first potential buyer agrees to pay for the at least one first item, or ii) at least one second option to select a first range of monetary amounts that the at least one first potential buyer agrees to pay for the at least one first item; code to receive, from the at least one first potential buyer, at least one first buyer offer for the at least one first item; code to consummate at least one first sale transaction when: i) the first monetary amount or the first range of monetary amounts of the at least one first buyer offer for the at least one first item respectively matches the first MAP or the first MAPR, and ii) the at least one first potential buyer has not previously submitted at least one other offer for the at least one first item so that a total number of offers made by the at least one first potential buyer is equal or less than the first MANBCs, wherein the total number of offers made by the at least one first potential buyer is a count of the at least one first buyer offer and the at least one other offer that the at least one first potential buyer submitted for the at lest one first item; and code to enable, the at least one first potential buyer to submit at least one second buyer offer for the at least one first item when: i) the monetary amount or range of monetary amounts of the at least one first buyer offer for the at least one first item do not respectively match the first MAP or the first MAPR, and ii) the at least one first potential buyer has not previously submitted the at least one other offer for the at least one first item so that the total number of offers made by the at least one first potential buyer is equal or less than the first MANBCs, wherein the total number of offers made by the at least one first potential buyer is a count of the at least one first buyer offer and the at least one other offer that the at least one first potential buyer submitted for the at least one first item.

In some embodiments, the instant invention further provides yet another computer-implemented method that at least includes steps of: displaying, by a computer device of at least one first potential buyer, a plurality of first identifying characteristics of at least one first item and at least one of: i) at least one first option to enter a first monetary amount that the at least one first potential buyer agrees to pay for the at least one first item, or ii) at least one second option to select a first range of monetary amounts that the at least one first potential buyer agrees to pay for the at least one first item, wherein the plurality of first identifying characteristics of the at least one first item specifically describe the at least one first item and specifically identify at least one first seller, and wherein the plurality of first identifying characteristics of the at least one first item are based on first seller information for at least one first item that the at least one first seller offers to sell; submitting, by the computer device of at least one first potential buyer, from the at least one first potential buyer, at least one first buyer offer for the at least one first item, wherein the at least one first buyer offer for the at least one first item cause to consummate at least one first sale transaction when: i) a first monetary amount or a first range of monetary amounts of the at least one first buyer offer for the at least one first item respectively matches a first Minimum Acceptable Price (a first MAP) that the at least one first seller is willing to accept or a first Minimum Acceptable Price Range (a first MAPR) within which the at least one first seller desires to receive offers to buy the at least one first item, and ii) the at least one first potential buyer has not previously submitted at least one other offer for the at least one first item so that a total number of offers made by the at least one first potential buyer is equal or less than a first Maximum Allowable Number of Negotiating Chances (a first MANBCs), wherein the total number of offers made by the at least one first potential buyer is a count of the at least one first buyer offer and the at least one other offer that the at least one first potential buyer submitted for the at lest one first item; and submitting, by the computer device of at least one first potential buyer, from the at least one first potential buyer, at least one second buyer offer for the at least one first item when: i) the monetary amount or range of monetary amounts of the at least one first buyer offer for the at least one first item do not respectively match the first MAP or the first MAPR, and ii) the at least one first potential buyer has not previously submitted the at least one other offer for the at least one first item so that the total number of offers made by the at least one first potential buyer is equal or less than the first MANBCs, wherein the total number of offers made by the at least one first potential buyer is a count of the at least one first buyer offer and the at least one other offer that the at least one first potential buyer submitted for the at least one first item.

BRIEF DESCRIPTION OF THE DRAWINGS

The present invention will be further explained with reference to the attached figures. The figures constitute a part of this specification and include illustrative embodiments of the present invention and illustrate various objects and features thereof. Specific functional details disclosed herein are not to be interpreted as limiting, but merely as a representative basis for teaching one skilled in the art to variously employ the present invention. The figures shown are not necessarily to scale, with emphasis instead generally being placed upon illustrating the principles of the present invention. Further, some features may be exaggerated to show details of particular components. In addition, any measurements, specifications and the like shown in the figures are intended to be illustrative, and not restrictive.

DETAILED DESCRIPTION

In some embodiments the present invention may be applicable to sale transactions for any product including, but not limited to, perishable products/services (e.g. hotels, airline flights, travel packages, cruise ships, car rentals) and other products/service.

The figures constitute a part of this specification and include illustrative embodiments of the present invention and illustrate various objects and features thereof. Further, the figures are not necessarily to scale, some features may be exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention.

Among those benefits and improvements that have been disclosed, other objects and advantages of this invention will become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the invention which are intended to be illustrative, and not restrictive.

Throughout the specification and claims, the following terms take the meanings explicitly associated herein, unless the context clearly dictates otherwise. The phrases "In some embodiments" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

In addition, as used herein, the terms "real time" means without undue delay and to be performed within a single time communication session while a potential buyer and a potential seller are (a) negotiating a potential sale transaction and/or (b) negotiating and consummating an actual sale transaction.

In some embodiments, the instant invention can allow sellers to obtain a protection in a form of a payment guarantee and a flexibility in avoiding public disclosure of details about negotiations and concluded sale transactions.

In some embodiments, the instant invention can allow a prospective buyer, prior to making his or her CPO, to know exact specific information about characteristics/features (e.g., quality, brand, number, etc.) on which he or she is expected to make and/or desires to make his or her decision to purchase a particular product/service for which he or she negotiates with a seller. In some embodiments, the instant invention refers to CPOs which are based on a buyer's knowledge of the specific information that is important to the buyer for making his or her purchasing decisions as (S)CPOs (further refers herein as "(S)CPO selling").

In some embodiments, the instant invention can allow to optimize sales revenue and achieve higher yields, by allowing sellers to adjust their selling strategy by dynamically switching between selling based on advertised prices (further refers herein as "SAP selling") and selling based on receiving (S)CPOs from buyers For example, in some embodiments, a hotel may only accept a (S)CPO to sell a specific room type to a buyer if certain conditions, inter alia, are met:

(a) the buyer's desired stay falls within a specific calendar period, and (b) the required length of stay exceeds 3 nights, and (c) the buyer comes from Japan.

In some embodiments, the instant invention can allow for (S)CPOs-based negotiations and transactions to be automatically processed in real-time and without the need of human intervention on the part of the seller.

For example, in some embodiments, as soon as a buyer decides to make his or her (S)CPO offer, the seller's response to the (S)CPO submitted by the buyer must be instantaneous and definitive, so that a deal can be closed on the spot. In some embodiments, the buyer is prevented from being able to reneged after his or her (S)CPO is submitted to the seller.

Illustrative Operating Environments for Some Embodiments of the Instant Invention Example 1

Figure 1:
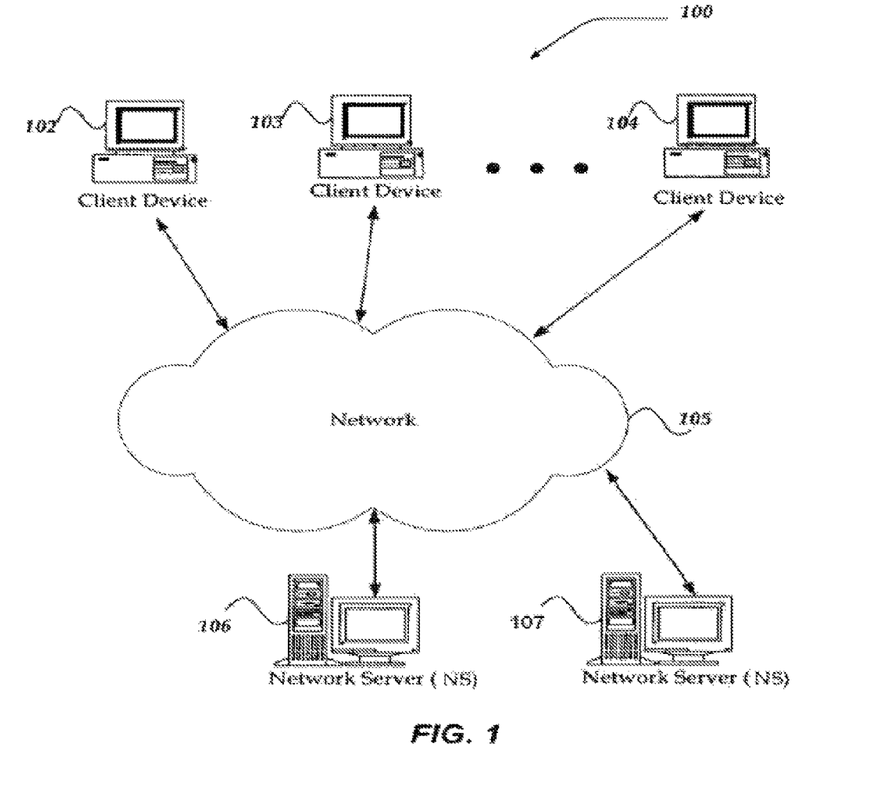
FIG. 1 illustrates a computer system in accordance with some embodiments of the present invention.

FIG. 1 illustrates a computer system in accordance with some embodiments of the present invention. However, not all of these components may be required to practice the invention, and variations in the arrangement and type of the components may be made without departing from the spirit or scope of the invention. In some embodiment, the inventive transaction system hosts a large number of members and concurrent transactions. In other embodiments, the inventive transaction computer system is based on a scalable computer and network architecture that incorporates varies strategies for assessing the data, caching, searching, and database connection pooling. An example of the scalable architecture is an architecture that is capable of operating multiple servers. In some embodiments, the computing system in accordance with the instant invention may include, but not limiting to, one or more programmed computers, systems employing distributed networking, or other type of system that might be used to transmit and process electronic data.

In some embodiments, client (buyer) devices 102-104 include virtually any computing device capable of receiving and sending a message over a network, such as network 105, to and from another computing device, such as seller servers 106 and 107, each other, and the like. In some embodiments, the set of such devices includes devices that typically connect using a wired communications medium such as personal computers, multiprocessor systems, microprocessor-based or programmable consumer electronics, network PCs, and the like. In some embodiments, the set of such devices also includes devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like. Similarly, In some embodiments, client (buyer) devices 102-104 are any device that is capable of connecting using a wired or wireless communication medium such as a PDA, POCKET PC, smart phone, wearable computer, and any other device that is equipped to communicate over a wired and/or wireless communication medium.

In some embodiments, each client device within client (buyer) devices 102-104 includes a browser application that is configured to receive and to send web pages, and the like. In some embodiments, the browser application is configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, JavaScript, .Net and the like.

In some embodiments, client (buyer) devices 102-104 are further configured to receive a message from the another computing device employing another mechanism, including, but not limited to email, Short Message Service (SMS), Multimedia Message Service (MMS), instant messaging (IM), internet relay chat (IRC), mIRC, Jabber, and the like.

In some embodiments, network 105 is configured to couple one computing device to another computing device to enable them to communicate. In some embodiments, network 105 is enabled to employ any form of computer readable media for communicating information from one electronic device to another. Also, In some embodiments, network 105 includes a wireless interface, and/or a wired interface, such as the Internet, in addition to local area networks (LANs), wide area networks (WANs), direct connections, such as through a universal serial bus (USB) port, other forms of computer-readable media, or any combination thereof. In some embodiments, on an interconnected set of LANs, including those based on differing architectures and protocols, a router acts as a link between LANs, enabling messages to be sent from one to another.

Also, in some embodiments, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, In some embodiments, remote computers and other related electronic devices could be remotely connected to either LANs or WANs via a modem and temporary telephone link. In essence, In some embodiments, network 105 includes any communication method by which information may travel between client (buyer) devices 102-104, and seller servers 106 and 107.

Example 2

Figure 2:
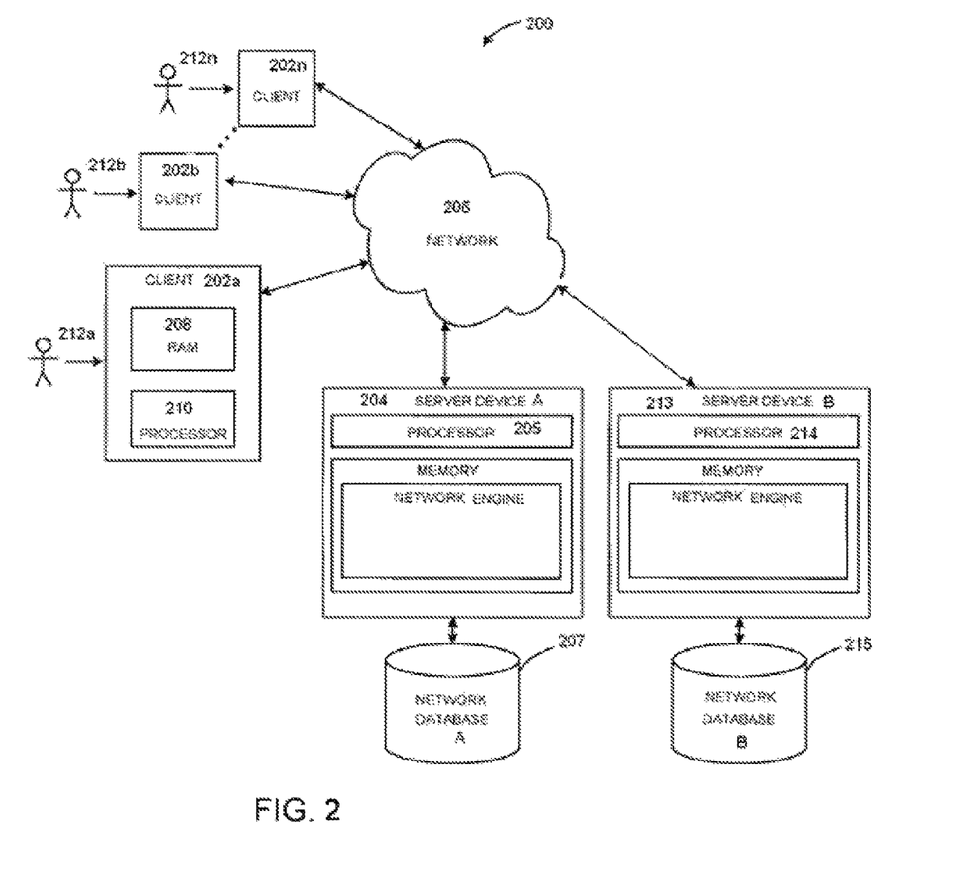
FIG. 2 illustrates a computer system in accordance with another embodiments of the present invention.

FIG. 2 shows another exemplary embodiment of the transaction computer and network architecture that supports a computer transaction system in accordance with some embodiments of the instant invention. The client (buyer) devices 202a, 202b thru 202n shown each can comprise a computer-readable medium, such as a random access memory (RAM) 208 coupled to a processor 210. The processor 210 can execute computer-executable program instructions stored in memory 208. Such processors can comprise a microprocessor, an ASIC, and state machines. Such processors comprise, or are be in communication with, media, for example computer-readable media, which stores instructions that, when executed by the processor, cause the processor to perform the steps described herein. Embodiments of computer-readable media include, but are not limited to, an electronic, optical, magnetic, or other storage or transmission device capable of providing a processor, such as the processor 210 of client (buyer) 202a, with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media transmit or carry instructions to a computer, including a router, private or public network, or other transmission device or channel, both wired and wireless. The instructions comprise code from any computer-programming language, including, for example, C, C++, C#, Visual Basic, Java, Python, Perl, and JavaScript.

Client (buyer) devices 202a-n also comprise a number of external or internal devices such as a mouse, a CD-ROM, DVD, a keyboard, a display, or other input or output devices. Examples of client devices 202a-n can be personal computers, digital assistants, personal digital assistants, cellular phones, mobile phones, smart phones, pagers, digital tablets, laptop computers, Internet appliances, and other processor-based devices. In general, a client (buyer) device 202a can be any type of processor-based platform that is connected to a network 206 and that interacts with one or more application programs. The client (buyer) devices 202a-n can operate on any operating system capable of supporting a browser or browser-enabled application, such as Microsoft™, Windows™, or Linux.

The client devices 202a-n shown can include, for example, personal computers executing a browser application program such as Microsoft Corporation's Internet Explorer™, Apple Computer, Inc.'s Safari™, Mozilla Firefox, and Opera. Through the client (buyer) devices 202a-n, buyers 212a-n communicate over the network 206 with each other and with other systems and devices coupled to the network 206.

As shown in FIG. 2, seller server devices 204 and 213 can be also coupled to the network 206.

In some embodiments, the instant invention can allow sellers to use Quick Response Codes (QR codes), including SPARQCode that is a matrix code (or two-dimensional bar code) encoding standard that is based on the physical QR Code), and/or near field communication devices ("NFC devices"), to advertise willingness to accept (S)CPOs, and/or to screen potential buyers to allow them to make (S)CPOs, and/or to at least facilitate at least a part of at least one process described herein.

In some embodiments, potential buyers with a camera smart phone equipped with a reader application can scan the image of the QR Code to display text, contact information, connect to a wireless network, or open a web page in the telephone's browser, or perform any other suitable action. In some embodiments, QR Codes may also be linked to a location to track where a code has been scanned. For example, either the application that scans the QR Code retrieves the geo information by using GPS and cell tower triangulation (aGPS) or the URL encoded in the QR Code itself is associated with a location. For example, the smart phone's browser that supports URI redirection, can allow QR Codes to send metadata to existing applications on the device.

In some embodiments, NFC can represent a short-range wireless communications technology in which NFC-enabled devices are "swiped," "bumped," "tap" or otherwise moved in close proximity to communicate. In some embodiments, NFC could include a set of short-range wireless technologies, typically requiring a distance of 10 cm or less.

In some embodiment, NFC can operates at 13.56 MHz on ISO/IEC 18000-3 air interface and at rates ranging from 106 kbit/s to 424 kbit/s. In some embodiments, NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, NFC peer-to-peer communication can be conducted when a plurality of NFC-enable device within close proximity of each other.

In some embodiments, NFC tags can contain data and be read-only or rewriteable. In some embodiment, NFC tags can be custom-encoded. In some embodiments, NFC tags and/or NFC-enabled device (e.g., smart phones with NFC capabilities) can securely store personal data such as debit and credit card information, loyalty program data, PINS and networking contacts, among other information.

In some embodiments, the data may also be communicated using any wireless means of communication, such as 4G, 3G, GSM, GPRS, WiFi, WiMax, and other remote local or remote wireless communication using information obtained via the interfacing of a wireless NFC enabled mobile device to a smart poster. In some embodiments, the term "wireless communications" includes communications conducted at ISO 14443 and ISO 18092 interfaces. In some embodiments, the communications between buyer's NFC-enabled smart device and provided equipment (e.g., terminals, POS, POE, Hosts) is performed, for example, in accordance with the ISO 14443A/B standard and/or the ISO 18092 standard.

In some embodiments, NFC tags can include one or more integrated circuits. In some embodiments, buyer's NFC-enabled smart device may further include a satellite positioning receiver coupled to the processor and receiving a satellite positioning system timing signal, and the processor may accordingly be configured to synchronize the internal timing signal to the satellite positioning system timing signal as the external timing signal. In some embodiments, the processor of buyer's NFC-enabled smart device may be configured to synchronize the internal timing signal to the common external system timing signal via the NFC circuit.

In some embodiments, buyer's NFC-enabled smart device may include a related physical computer-readable medium and may have computer-executable instructions for causing buyer's NFC-enabled smart device to initiating peer-to-peer NFC communications with another NFC device when in range thereof and upon being simultaneously switched to the peer-to-peer recognition state therewith.

In some embodiments, the processor of buyer's NFC-enabled smart device may be configured for communicating wireless voice and data via a cellular transceiver via a cellular communications network. By way of example, the data communications may include, but not limited to, email messages, Web data, etc. In some embodiments, buyer's NFC-enabled smart device may in addition (or instead) include other types of wireless communications circuits capable of transmitting voice or other data, such as a wireless LAN, WiMAX, etc., circuit. In some embodiments, the processor of buyer's NFC-enabled smart device may proceed directly to communicate with the trusted NFC device, and in the case of a "smart poster" NFC device (e.g., SLP/SLS), such as one configured to pass a Uniform Resource Locator (URL), the processor may automatically direct a browser application thereof to the URL without prompting for permission to proceed to the designated location.

Illustrative Methods and Systems of Some
Embodiments of the Instant Invention

Example 3

In some embodiments, provided that certain criteria (e.g., predetermined criteria) are met (but not necessarily required), a seller server (e.g., a hotel operator server) can receive an offer which can specify a type of product (e.g., a room type of hotel), at least one condition (e.g., stay dates), and an offer price specified by a buyer. In some embodiments, the seller server can also receive an associated payment identifier that can specify a financial payment instrument, for example, but not limited to, a credit card account, a PayPal account, Google wallet, checking account, etc.

In some embodiments, the seller can determine whether to accept the offer, based at least in part on various factors such as, but not limited to, the offer price and availability of appropriate products to satisfy the conditions of the offer (e.g., a number of available rooms of certain type on a specific date and/or a range of dates).

In some embodiments, if the offer is accepted by the seller, a payment is provided to the seller using the payment identifier. In some embodiments, if the offer is accepted by the seller, a payment is provided, in real-time, to the seller using the payment identifier. In some embodiments, if the offer is accepted by the seller, a payment is provided, in real-time, to the seller using the payment identifier and the buyer has no opportunity to renegade on his or her offer. In some embodiments, if the offer is accepted by the seller, a payment is provided, in real-time, to the seller using the payment identifier resulting in the completed transaction of the instant invention. In some embodiments, if the offer is accepted by the seller, even if no immediate payment is received, the seller's acceptance create a binding contract between the seller and the buyer thus resulting in the financial obligation from the buyer to the seller—i.e., the buyer cannot renege or withdraw his or her offer.

In some embodiments, after the completed transaction, the buyer can be financially penalized for changing his or her completed transaction. For example, a hotel can impose a penalty for cancelling or revising the reservation. In some embodiments, the instant invention may allow a buyer to revise but not completely cancel the completed transaction during a certain period of time—for example, 15 minutes, 1 hour, 24 hours, 72 hours,—after the transaction is completed.

In some embodiments, the seller server receives from a seller (e.g., a hotel, an airline, a store) a seller's specified Minimum Acceptable Price (MAP)—a seller's predetermined parameter—for a particular service and/or product. In some embodiments, a first offer that is equal to or a penny above MAP must be accepted by seller and legally obligates the seller to provide product/service to a buyer who submits the first acceptable offer.

In some embodiments, the seller server receives from a seller (e.g., a hotel, an airline, a store) a seller's specified Minimum Acceptable Price Range (MAPR)—a seller's predetermined parameter—for a particular service and/or product. In some embodiments, a first offer that is within MAPR must be accepted by seller and legally obligates the seller to provide product/service to a buyer who submits the first acceptable offer. For example, a hotel can set a condition that the hotel will accepts a buyer's offer for a room in a particular category if the buyer's offer would be within at MAPR of $150-200.

In some embodiments, when a first offer is within MAPR and one or more additional criteria set by the seller are matched, the offer must be accepted by seller and legally obligates the seller to provide product/service to a buyer who submits the first acceptable offer. For example, a hotel can set a condition that the hotel will accept a buyer's offer for a room in a particular category if the buyer's offer would be within at MAPR of $150-200 and the hotel has at least three rooms of the same category available.

In some embodiments, when a first offer is within MAPR or when the first offer is within MAPR and one or more additional criteria set by the seller are matched, the seller is more likely to accept the offer but is not legally obligated to provide product/service until the seller actually accepts the buyer's offer. For example, a hotel can set a condition that the hotel will accept a buyer's offer for a room in a particular category if the buyer's offer would be within at MAPR of $150-200 and the hotel has at least three rooms of the same category available.

In some embodiments, the seller can set up the MAP and the MAPR. For instance, the hotel will accept a buyer's offer that is at or above MAP. In addition, the hotel would also entertain an offer that is within the MAPR, where MAP is at least within the MAPR.

In some embodiments, a seller can identify several subranges within MAPRs and rank the subranges in order of the likelihood that the seller will accept an offer that falls within a particular subrange. For instance, the hotel could set a MAPR of $150-200, and then the following 5 subrange with ranking:

Subrange 1: $150-164—low likelihood of offer acceptance;

Subrange 2: $165-179—more likelihood of offer acceptance;

Subrange 3: $180-194—higher likelihood of offer acceptance; and

Subrange 4: $195-200—very high likelihood of offer acceptance.

In some embodiments, the inventive platform relies on past transaction history associated of a particular seller and/or transaction history associated with other seller(s) who are/is in the same or sufficiently comparable business and/or offered/sold the same or sufficiently comparable product(s)/service(s).

In some embodiments, the instant invention would display or cause to display to a user, on user's computing device, a list of subranges with qualitative labels of likelihood of success, based on seller's MAPR, so as to provide the user a bidding guidance.

In some embodiments, the inventive programmed platform of the instant invention also provides a bidding feedback information to a seller, identifying how many users submitted offers at what subrange(s). In some embodiments, based on the feedback bidding information, the seller can adjust/change/eliminate MAPR (and offer just a MAP) and subranges. In some embodiments, the bidding feedback information can be in a graphical form (e.g., bar graph). In some embodiments, the feedback bidding information can also include bidding information of other sellers. In some embodiments, the bidding feedback information can be normalized (i.e., translated) to a seller's desired range.

In some embodiments, based on the bidding feedback information and/or other information (e.g., change in the booking and occupancy for a hotel), seller may narrow or broad MAPR which can translate in having more or less subranges where each subrange would be correspondingly narrowed or broaden.

For instance, as the hotel is being booked for particular type of room, the hotel would adjust MAPR (1) of $150-200 to MAPR (2) of $180-200. Consequently, there can be less subranges from 4 initial subranges (as shown above) to just 2:

Subrange 1: $180-189—lower likelihood of offer acceptance; and

Subrange 2: $190-201—higher likelihood of offer acceptance.

In another alternative embodiment, the can be the same 4 subranges of smaller increments (e.g., $5 each):

Subrange 1: $181-185—low likelihood of offer acceptance;

Subrange 2: $186-190—more likelihood of offer acceptance;

Subrange 3: $191-195—high likelihood of offer acceptance; and

Subrange 4: $196-200—very high likelihood of offer acceptance.

In some embodiments, as detailed above, the inventive platform establishes a marketplace for negotiation between its users-buyers and its users-sellers by framing subranges for the negotiation.

In some embodiments, the inventive platform establishes a marketplace for negotiation between its users-buyers and its users-sellers by displaying subranges within a ranges that larger or narrower than seller's offered MAPR received by the inventive platform. In some embodiments, the inventive platform displays its own range based on seller's MAPR and historical transaction data accumulated by the inventive platform.

In some embodiments, the inventive platform displays a range or subranges that represent a seller's normalized MAPR based on the inventive platform's normalization function and/or seller's desired normalization function. In some instances, the ability to normalize the MAPR allows the seller to forecast its revenue.

In some embodiments, the inventive platform of the instant invention displays on user's computing device (e.g., mobile phone, PDA, smart phone, etc) subranges or numbers in the form of clickable buttons thus eliminating the need for manually text entering by the user.

In some embodiments, displays subranges of a particular MAPR in a multiple choice format. In some embodiments, the inventive platform allows the user to rank subranges in order in which they should be submitted, by the inventive platform, to the seller for consideration.

In some embodiments, the seller may specify one or more MAPs for each product/service based on one or more additional criteria that include, but is not limited to, wanted quantity, buyers' personal characteristics (e.g., a single buyer, a group of buyers, sex, age, income level, etc), buyer's historical spending pattern(s), past and/or current demand (e.g., seasonal demand), etc.

In some embodiments, the seller server further receives from a seller (e.g., a hotel, an airline, a store) a seller's specified Maximum Allowable Number of Negotiating Chances (MANBCs)—another seller's predetermined parameter—i.e., how many consecutive offers a buyer can make for a particular service and/or product within a limited time interval. In some embodiments, MANBCs can represent how may attempts/offers all potential buyers can make in total. In some embodiments, MANBCs can be a single attempt/offer. In some embodiments, MANBCs can be two attempts/offers. In some embodiments, MANBCs can be three attempts/offers. In some embodiments, MANBCs can be four attempts/offers. In some embodiments, MANBCs can be five attempts/offers.

In some embodiments, MANBCs can be at least one. In some embodiments, MANBCs can be at least two. In some embodiments, MANBCs can be at least three. In some embodiments, MANBCs cannot be more than ten. In some embodiments, MANBCs cannot be more than seven. In some embodiments, MANBCs be any number; however, there can be only certain number of MANBCs within a certain period of time per buyer IP address; and/or Buyer ID and/or Buyer Credit card number; and any other suitable identifier of the same buyer (e.g., 2 MANBCs within 15 minutes, 2 MANBCs within 1 hour, 2 MANBCs within 24 hours, etc.) In some embodiments, a seller can specify a total number of MANBCs and the seller server can determine how many MANBCs to allow with a certain time period. In some embodiments, a seller can specify a first number of MANBCs if offers received from a single buyer and a second number of MANBCs if offers received from a group of cooperating buyers. In some embodiments, the second number can be larger than the first number. In some embodiments, the second number can be smaller than the first number.

In some embodiments, the inventive platform of the instant invention allows a buyer a certain number of free chances, free MANBCs, (e.g., free MANBC of 1, 2, 3, 4, etc) to make one or more offers on a product/service to a seller, and then charge a particular amount for a next chance, paid MANBCs, after the free MANBC(s) are used up. In some embodiments, the amount charged for each paid chance for the buyer to make his/her offer is increased with each subsequent paid chance. In some embodiments, the amount charged for each subsequent paid chance remains the same. In some embodiments, the amount charged for each subsequent paid chance varies based on a predetermined rate of increase (e.g., 1st paid chance costs $1, 2nd paid chance costs $2, etc) or based on one or more factors such as, but not limited to, buyer's demographic characteristic(s), buyer's purchasing characteristic(s), buyer's social media characteristic(s), buyer's membership level with a seller, buyer's membership level with the inventive platform, seller's characteristic(s), product/service's characteristic(s), etc. In some embodiments, all chances given to the buyer are paid chances (i.e., MANBCs=paid MANBCs) (e.g., a buyer pays a certain amount to have a certain number of chances).

In some embodiments, based on particular MAPRs and MANBCs, the inventive platform of the instant invention displays, to a buyer, a multiple-choice form broken down into a plurality of subranges and allows the buyer one or more free chances (defined by free MANBCs) to submit sequential offers by selecting particular subrange(s) with each free chance. In some embodiments, utilizing paid chances (paid MANBCs), the inventive platform of the instant invention displays, to the buyer, sequentially less numbers of ranges and/or more narrowed ranges to guide the buyer in the direct of making an offer that would have a potentially high likelihood of being accepted by the seller. For instance, in some embodiments, a particular MAPR can be displayed to the buyer as being broken down into 10 subranges and the buyer is given 2 free chances (free MANBCs=2) to submit a particular subrange as his/her offer to the seller. In such example, the buyer can further pay certain amount(s) to receive an opportunity to submit each subsequent chance after the two free chances. In some embodiments of the same example, with each paid chance, the inventive platform displays a sequentially smaller number of subranges (e.g., for the 1st paid chance, only 8 subranges are displayed, for the 2nd paid chance, only 6 subranges are displayed, and with, for instance, the 5th paid chance, only one subrange is displayed). In some embodiments, subranges of possible choices within the MAPR could be re-adjusted so as to omit from the subsequent displaying one or more subranges that are substantially less than the MAP. In some embodiments, subranges of possible choices within the MAPR could be automatically re-adjusted by the inventive platform so as to omit from the subsequent displaying one or more subranges that are substantially less than the MAP. However, as this particular example illustrates, in some embodiments, the inventive platform works as intelligent engine that assists the buyer, for a fee, to make offer(s) that are more likely to succeed in being accepted by the seller.

In some embodiments, the seller server does not inform a buyer about MANBCs. In some embodiments, the seller server informs a buyer about MANBCs for a particular product/service. In some embodiments, the seller server does not inform a buyer, prior to receiving a first offer from the buyer, about how many MANBCs are allowed for this particular product/service.

In some embodiments, the seller may specify one or more MANBCs for each product/service based on one or more additional criteria that include, but is not limited to, wanted quantity, buyers' personal characteristics (e.g., a single buyer, group of buyers, sex, age, income level, etc), buyer's historical spending pattern(s), past and/or current demand (e.g., seasonal demand), Buyer IP address, etc.

In some embodiments, one or more MAPs and associated MANBCs can be stored in a Retail Price Database(s) (RPDs). In some embodiments, particular RPDs can be individual to a particular seller. In some embodiments, RPDs can include MAPs and MANBCs for more than one product/service of a plurality of sellers. In some embodiments, RPDs can reside remotely from the seller server separated by a network.

Example 4

In some embodiments, the seller server is a server that directly communicates with one or more buyers, is not managed by a particular seller, and accesses MAPs/MANBCs and product(s)/service(s) information from one or more RPDs of one or more, related or unrelated, sellers.

In some embodiments, a seller server can receive a buyer's offer by various communication ways such as, but is not limited to: the offer can be transmitted via email to the seller server, or the seller server may access a database where the offer is stored.

In some embodiments, offer(s) can be representative of a group of buyers. In some embodiments, the instant invention allows a group of buyers to collaborate over one or more social media applications (e.g., Facebook, Google+, twitter, etc) to transmit offer(s) to the seller server. In some embodiments, the seller server can recognize that the received offer(s) are/is submitted from member(s) of a particular group and count each offer toward a product/service's MANBC number.

In some embodiments, the seller server applies logic (e.g. algorithm or other logic) to determine (e.g., if the buyer's offer meets (i.e., equals to or exceeds) the seller's MAP and/or MAPR; or if the buyer has reached seller's MANBCs for the product/service that the buyer wants). For example, in some embodiments, the logic engine can dynamically adjust the pre-defined values of MAP, and/or MAPR, and/or MANBCs (e.g., free MANBC, paid MANBC, or both) per (S)CPO, according to one or more of the following criteria imposed on various parameters which may include, but not limited to:

a) Date of booking=Date that the product (S)CPO is made;
b) Date of Check-in=Date of buyer Check-in (flight, cruise, event etc);
c) Weekday of booking=Weekday (Monday to Sunday) in which the booking attempt is made;
d) Days ahead of arrival=How many days ahead of desired arrival the booking attempt is made;
e) Product availability=The number of products (room types, seats etc) or service units (e.g., spa treatments) that are available;
f) Allotment booked=The number of products (room types, seats etc) and/or service units (e.g., spa treatments) that are already sold;
g) Occupancy Level=the number of specific product(s)/service unit(s) that are already purchased for a specific date (e.g., the room occupancy level of a Hotel on a specified date, the seat occupancy level of a specific flight on a specified date, shiatsu treatments on a specified date, etc);
h) Total cost=Total cost of attempted transaction;
i) Times applied=How many times the certain dynamic policy has resulted in a successful outcome (i.e. transaction);
j) Demand=The number of product requests (i.e. indication of interest in at least one parameter of the specific product or service—irrespective of whether booked or not) that the system has previously received;
k) Market=The country origin of the buyer (based on the client's IP address); and/or
l) Customer ID Profile=The specific details in the customer profile of an already identified individual (based on his Customer ID Profile credentials) (example: Mr. Jones has booked with us 3 times in the past, adding to a total of 10 room nights and has created a revenue of 1500 Euros).

In some embodiments, the buyer's offer is either accepted or rejected. In some embodiments, the buyer's offer is either instantaneously, in real time, accepted or rejected. In some embodiments, the buyer's offer is either accepted or rejected within a certain period of time to which the buyer agrees that he or she cannot renege and/or change the offer within that period of time.

In some embodiments, to make sure that buyers do not "game" the process by engaging in a (S)CPO process of the instant invention, for example, several times a day, the instant invention can use various computer implementations, including but not limited to, IP tracking, restricted login, cookie tracking, and other suitable technologies.

Example 5

Figure 3:
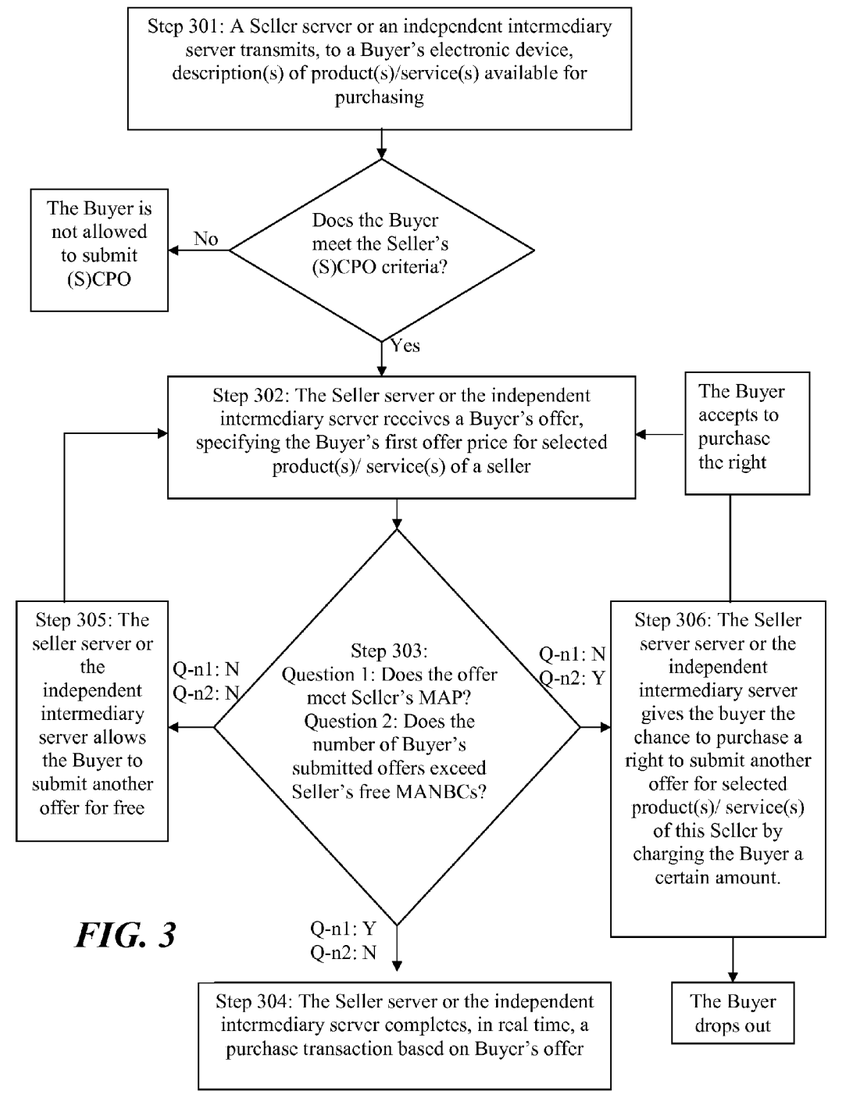
FIG. 3 illustrates a schematic diagram in accordance with some embodiments of the present invention.

FIG. 3 is a flowchart representing some embodiments of the instant invention.

In some embodiments, in step 301, a seller server or an independent intermediary server transmits to a potential buyer's electronic device (e.g., computer, laptop, PDA, smart phone, etc) detailed description(s) of product/service available for purchasing from one or more sellers (e.g., perishable products/services such as, but not limited to hotel rooms, airline flights, travel packages, cruise ships, car rentals, and other suitable products/service). For example, in step 301, the seller server or the independent intermediary server transmits computer instruction(s) to cause the buyer's electronic device to allow the buyer to select a specific hotel and/or a specific room type. For example, the room type can be one or more of room characteristics, including but not limited to, number of beds, type of beds, room size, standard room, suite, location with respect to floor, a section of hotel (e.g., away from restaurant), outside view, etc.). For example, the information provided by the seller server or the independent intermediary server can include the followings:

1) Sheraton hotel on Avenue of Americas in NYC has available a standard room with city view, a standard room with partial city view and a king bed, a regular suit on floors 9-14, and a penthouse suite;

2) Sofitel hotel on Bryant Park in NYC has available a standard room with city view, a standard room with partial city view and a king bed, a regular suit on floors 20-25, and a penthouse suite.

In some embodiments, in step 302, provided certain criteria are met, but not necessarily required, (e.g., (a) the buyer's desired stay falls within a specific calendar period, (b) the required length of stay exceeds 3 nights, and (c) the buyer comes from Japan), the seller server or an independent intermediary server gives the buyer the opportunity to submit an offer and subsequently receives an offer from a buyer. As described above, the offer specifies a first price that a buyer is willing to pay for buyer's selected product(s)/service(s) of a particular seller. For example, in step 302, the seller server or the independent intermediary server receives from the buyer an electronic offer identifying that the buyer wants the standard room with city view at Sofitel hotel and is willing to pay $250 per night.

For example, in step 302, the seller server or the independent intermediary server can also receive buyer's associated payment identifier that specifies buyer's financial payment account which buyer's payment information is not already stored and/or verified by the seller server.

In some embodiments, in step 303, the seller server or the independent intermediary server applies logic (e.g. algorithm or other logic) to determine, in one example, if the buyer's offer meets (i.e., equals to or exceeds) the seller's MAP and, in another example, if the buyer has reached seller's MANBC for the product/service that the buyer wants. For example, in step 303, the seller server or the independent intermediary server determines if the buyer's $250-a-night offer meets Sofitel's MAP and if Sofitel's MANBC is not reached.

In another example, in some embodiments, the inventive logic engine of the seller server or the independent intermediary server can dynamically adjust the pre-defined values of MAP, and/or MAPR, and/or MANBCs (e.g., free MANBC, paid MANBC, or both) per (S)CPO, according to one or more of the following criteria imposed on various parameters which may include, but not limited to:

a) Date of booking=Date that the product (S)CPO is made;

b) Date of Check-in =Date of buyer Check-in (flight, cruise, event etc);

c) Weekday of booking=Weekday (Monday to Sunday) in which the booking attempt is made;

d) Days ahead of arrival=How many days ahead of desired arrival the booking attempt is made;

e) Product availability=The number of products (room types, seats etc) or service units (e.g., spa treatments) that are available;

f) Allotment booked=The number of products (room types, seats etc) and/or service units (e.g., spa treatments) that are already sold;

g) Occupancy Level=the number of specific product(s)/service unit(s) that are already purchased for a specific date (e.g., the room occupancy level of a Hotel on a specified date, the seat occupancy level of a specific flight on a specified date, shiatsu treatments on a specified date, etc);

h) Total cost=Total cost of attempted transaction;

i) Times applied=How many times the certain dynamic policy has resulted in a successful outcome (i.e. transaction);

j) Demand=The number of product requests (i.e. indication of interest in at least one parameter of the specific product or service—irrespective of whether booked or not) that the system has previously received;

k) Market=The country origin of the buyer (based on the client's IP address);

l) Customer ID Profile=The specific details in the customer profile of an already identified individual (based on his Customer ID Profile credentials) (example: Mr. Jones has booked with us 3 times in the past, adding to a total of 10 room nights and has created a revenue of 1500 Euros);

m) Date(s) of Stay=The Date(s) of the buyer's desired Stay;

n) Date of arrival=Desired Date of Client's Arrival;

o) Date of departure=Desired Date of Client's Departure;

p) Weekday of arrival=Weekday (Monday to Sunday) of the desired date of client's arrival;

q) Weekday of departure=Weekday (Monday to Sunday) of the desired date of client's departure;

r) Contains date=Whether the attempted booking contains a specific Date;

s) Contains weekday=Whether the attempted booking contains a specific Weekday or a range of Weekdays;

t) Length of stay=Number of days of desired stay;

u) Number of rooms=Number of rooms of booking attempt;

v) Number of guests=Number of guests of booking attempt; and/or w) PAX Combinations=A Specific set of room occupancy combinations (e.g., 2 Adults+2 Children).

In some embodiments, if, in step 303, the seller server or the independent intermediary server determines that the buyer's offer meets (i.e., equals to or exceeds) the seller's MAP for the product/service that the buyer wants to buy and the number of the buyer's attempts is less or equal to seller's specified MANBC, then, in step 304, the seller server or the independent intermediary server completes, in real time, a transaction in which the buyer's financial payment account is charged $250.

For example, if, in step 303, the seller server or the independent intermediary server determines that the buyer's $250-a-night offer meets Sofitel's MAP and the number of buyer's attempts is equal or less than MANBC, then, in step 304, the seller server completes, in real time, a transaction in which the buyer's financial payment account is charged $250.

In some embodiments, if, in step 303, the seller server or the independent intermediary server determines that the buyer's offer does not meet (i.e., equals to or exceeds) the seller's MAP for the product/service that the buyer wants, then, in step 305, the seller server can provide the buyer (through one or more notification methods including, but not limited to, email, instant messaging, social media and/or web messaging) another attempt to submit another offer until either one of buyer's next offer(s) meets the seller's MAP or a number of MANBC specified by the seller for this product/service is reached.

For example, if, in step 303, if the seller server or the independent intermediary server determines that the buyer's $250-a-night offer does not meet Sofitel's MAP and if Sofitel's MANBC is not reached, then, in step 305, the seller server or the independent intermediary server allows the buyer to make another offer and the buyer, for instance, offers to pay $275 a night and, in another example, within a specified time period, wherein the specified time period is designated by a third party and/or seller.

In some embodiments, if, in step 303, the seller server or the independent intermediary server determines that the buyer's offer does not meet (i.e., equals to or exceeds) the seller's MAP for the product/service that the buyer wants and that the buyer exceeded the number of MANBC specified by the seller, then, in step 306, the seller server or the independent intermediary server locks the buyer out from the ability to make further offers for this product/service. For example, in step 305, if the seller server or the independent intermediary server determines that the buyer's $250-a-night offer does not meet Sofitel's MAP and Sofitel's MANBC for this room is exceeded, then, in step 306, the seller server locks the buyer out from the ability to make further offers for Sofitel's standard room with city view.

In one embodiment, although the buyer is "locked out" from the specific previous offer, the buyer may be allowed to make one or more different offers with similar characteristics (e.g. a different specific room (e.g., suit with city view on 12-15 floors) at the Sofitel, and/or a specific room at a "comparable" hotel (e.g., Sheraton on 6th Avenue), and/or other different specific details at other specific hotels).

Example 6

Figure 4:
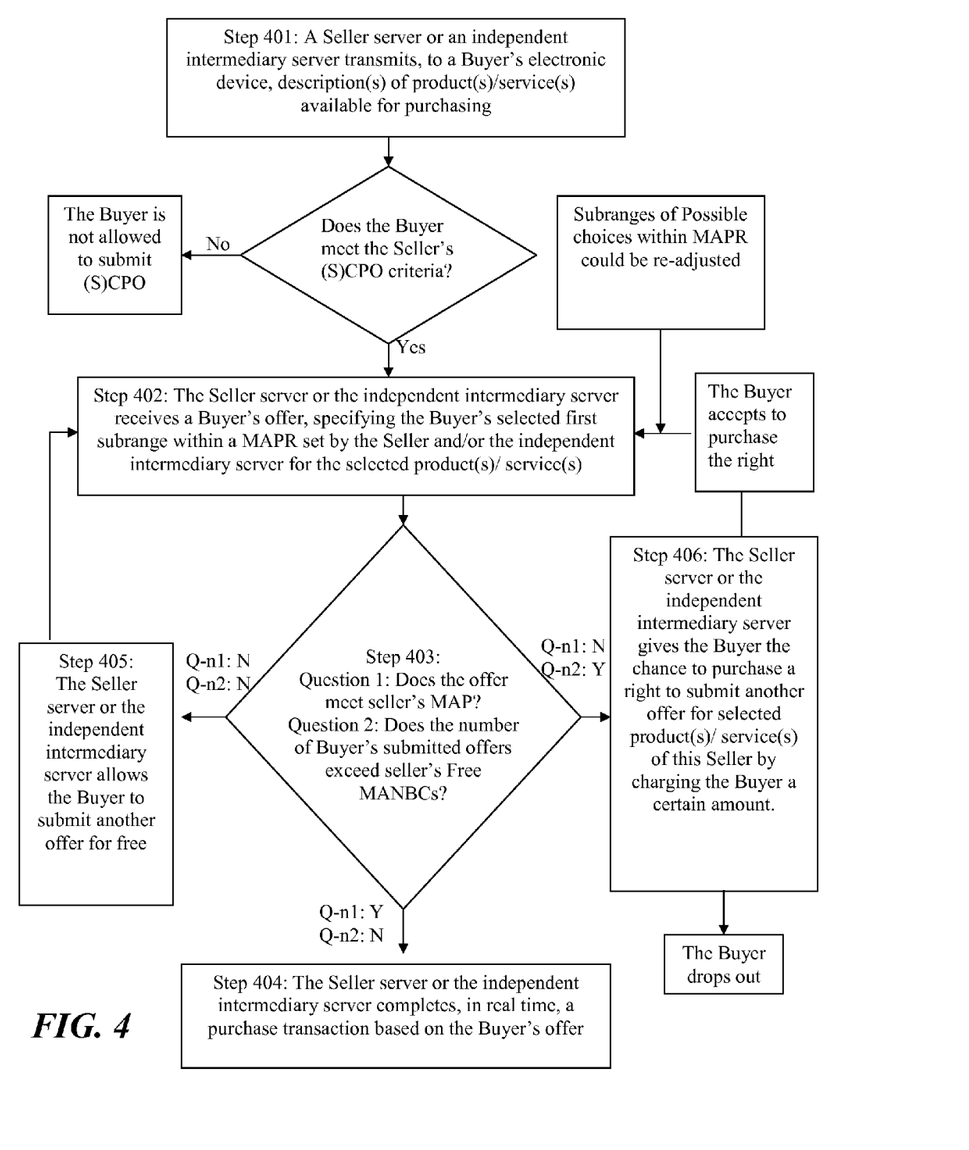
FIG. 4 illustrates another schematic diagram in accordance with some embodiments of the present invention.

FIG. 4 is a flowchart representing some embodiments of the instant invention.

In some embodiments, in step 401, a seller server or an independent intermediary server transmits to a potential buyer's electronic device (e.g., computer, laptop, PDA, smart phone, etc) detailed description(s) of product/service available for purchasing from one or more sellers (e.g., perishable products/services such as, but not limited to hotel rooms, airline flights, travel packages, cruise ships, car rentals, and other suitable products/service). For example, in step 401, the seller server or the independent intermediary server transmits computer instruction(s) to cause the buyer's electronic device to allow the buyer to select a specific hotel and/or a specific room type. For example, the room type can be one or more of room characteristics, including but not limited to, number of beds, type of beds, room size, standard room, suite, location with respect to floor, a section of hotel (e.g., away from restaurant), outside view, etc.). For example, the information provided by the seller server or an independent intermediary server can include the followings:

1) Sheraton hotel on Avenue of Americas in NYC has available a standard room with city view, a standard room with partial city view and a king bed, a regular suit on floors 9-14, and a penthouse suite;

2) Sofitel hotel on Bryant Park in NYC has available a standard room with city view, a standard room with partial city view and a king bed, a regular suit on floors 20-25, and a penthouse suite.

In some embodiments, in step 402, provided certain criteria are met, but not necessarily required, (e.g., (a) the buyer's desired stay falls within a specific calendar period, (b) the required length of stay exceeds 3 nights, and (c) the buyer comes from Japan), the seller server or the independent intermediary server gives the buyer the opportunity to submit an offer and subsequently receives an offer from a buyer. As described above, the offer specifies a first range of prices that a buyer is willing to pay for buyer's selected product(s)/service(s) of a particular seller. For example, in step 402, the seller server or the independent intermediary server receives from the buyer an electronic offer identifying that the buyer wants the standard room with city view at Sofitel hotel and is willing to pay in a range between $250-$260 per night.

For example, in step 402, the inventive platform receives from the seller a MAP that seller is willing to accept or is obligated to accept. In step 402, the inventive platform also receives from the seller a MAPR. In some embodiments, in step 402, the inventive platform generates the MAPR based on the seller's provided by MAP. In some embodiments, in step 402, the inventive platform in collaboration with input from the seller generates the MAPR based on the seller's provided by MAP. Consequently, in some embodiments, in step 402, the seller server or the independent intermediary server receives a buyer's offer, specifying the buyer's selected first subrange within a MAPR set by a seller and/or the independent intermediary server for the selected product(s)/service(s) and/or the independent intermediary server.

For example, in step 402, the seller server or the independent intermediary server can also receive buyer's associated payment identifier that specifies buyer's financial payment account which buyer's payment information is not already stored and/or verified by the seller server.

In some embodiments, in step 403, the seller server or the independent intermediary server applies logic (e.g. algorithm or other logic) to determine, in one example, if the seller is willing to accept buyer's offer (i.e., room is available, no expectation that the seller can receive a higher price in the future) and, in another example, if the buyer has reached seller's MANBC for the product/service that the buyer wants. For example, in step 403, the seller server or the independent intermediary server determines if the buyer's range of $250-260 offer meets Sofitel's MAPR, Sofitel's willingness to book at that price and if Sofitel's MANBC is not reached.

In another example, in some embodiments, the inventive logic engine of the seller server or the independent intermediary server dynamically displays to the buyer a plurality of choices representative of subranges that the inventive logic engine has generated based on seller's MAPR. In some embodiments, the inventive logic engine further determines how many free and paid chances the buyer can have, where total number of chance allowed to the buyer is equal seller's MANBC. In some embodiments, the inventive logic engine generates multiple choices of pre-determined subranges and offers a predetermined number of free or paid chances per (S)CPO based on one or more of the following criteria which include, but not limited to:

a) Date of booking=Date that the product (S)CPO is made;
b) Date of Check-in =Date of buyer Check-in (flight, cruise, event etc);
c) Weekday of booking=Weekday (Monday to Sunday) in which the booking attempt is made;
d) Days ahead of arrival=How many days ahead of desired arrival the booking attempt is made;
e) Product availability=The number of products (room types, seats etc) or service units (e.g., spa treatments) that are available;
f) Allotment booked=The number of products (room types, seats etc) and/or service units (e.g., spa treatments) that are already sold;
g) Occupancy Level=the number of specific product(s)/service unit(s) that are already purchased for a specific date (e.g., the room occupancy level of a Hotel on a specified date, the seat occupancy level of a specific flight on a specified date, shiatsu treatments on a specified date, etc);
h) Total cost=Total cost of attempted transaction;
i) Times applied=How many times the certain dynamic policy has resulted in a successful outcome (i.e. transaction);
j) Demand=The number of product requests (i.e. indication of interest in at least one parameter of the specific product or service—irrespective of whether booked or not) that the system has previously received;
k) Market=The country origin of the buyer (based on the client's IP address);
l) Customer ID Profile=The specific details in the customer profile of an already identified individual (based on his Customer ID Profile credentials) (example: Mr. Jones has booked with us 3 times in the past, adding to a total of 10 room nights and has created a revenue of 1500 Euros);
m) Date(s) of Stay=The Date(s) of the buyer's desired Stay;
n) Date of arrival=Desired Date of Client's Arrival;
o) Date of departure=Desired Date of Client's Departure;
p) Weekday of arrival=Weekday (Monday to Sunday) of the desired date of client's arrival;
q) Weekday of departure=Weekday (Monday to Sunday) of the desired date of client's departure;
r) Contains date=Whether the attempted booking contains a specific Date;
s) Contains weekday=Whether the attempted booking contains a specific Weekday or a range of Weekdays;
t) Length of stay=Number of days of desired stay;
u) Number of rooms=Number of rooms of booking attempt;
v) Number of guests=Number of guests of booking attempt; and/or
w) PAX Combinations=A Specific set of room occupancy combinations (e.g., 2 Adults+2 Children).

In some embodiments, if, in step 403, the seller server or the independent intermediary server determines that the buyer's offer is acceptable to the seller and the number of the buyer's attempts is less or equal to seller's specified MANBC, then, in step 404, the seller server completes, in real time, a transaction in which the buyer's financial payment account is charged in an amount that falls within the range offered by the buyer (e.g., $250-260 for Sofitel's particular room.

In some embodiments, in step 403, for paid chances, the inventive logic generates a plurality of subranges that are more likely to be accepted by the seller.

In some embodiments, the instant invention provides for a computer-implemented method that includes at least the following steps of: programming at least one computer system to perform at least the steps of: receiving, by a computer system, from at least one first seller, first seller information for at least one first item that the at least one first seller offers to sell; determining, by the computer system, from the seller information at least the following conditions for the at least one first item: i) a plurality of first identifying characteristics that specifically describe the at least one first item and specifically identify the at least one first seller; ii) a first Minimum Acceptable Price (a first MAP) that the at least one first seller is willing to accept and a first Minimum Acceptable Price Range (a first MAPR) within which the at least one first seller desires to receive at least one first offer to buy the at least one first item, and iii) a first Maximum Allowable Number of Negotiating Chances (a first MANBCs) per each buyer; displaying, by the computer system, to at least one first potential buyer, on a screen of a computer device, the plurality of first identifying characteristics of the at least one first item and at least one of: i) at least one first option to enter a first monetary amount that the at least one first potential buyer agrees to pay for the at least one first item, or ii) at least one second option to select a first range of monetary amounts that the at least one first potential buyer agrees to pay for the at least one first item; receiving, by the computer system, from the at least one first potential buyer, at least one first buyer offer for the at least one first item; consummating, by the computer system, at least one first sale transaction when: i) the first monetary amount or the first range of monetary amounts of the at least one first buyer offer for the at least one first item respectively matches the first MAP or the first MAPR, and ii) the at least one first potential buyer has not previously submitted at least one other offer for the at least one first item so that a total number of offers made by the at least one first potential buyer is equal or less than the first MANBCs, wherein the total number of offers made by the at least one first potential buyer is a count of the at least one first buyer offer and the at least one other offer that the at least one first potential buyer submitted for the at lest one first item; and enabling, by the computer system, the at least one first potential buyer to submit at least one second buyer offer for the at least one first item when: i) the monetary amount or range of monetary amounts of the at least one first buyer offer for the at least one first item do not respectively match the first MAP or the first MAPR, and ii) the at least one first potential buyer has not previously submitted the at least one other offer for the at least one first item so that the total number of offers made by the at least one first potential buyer is equal or less than the first MANBCs, wherein the total number of offers made by the at least one first potential buyer is a count of the at least one first buyer offer and the at least one other offer that the at least one first potential buyer submitted for the at least one first item.

In some embodiment, the at least one item is at least one first product or at least one first service that the at least one first seller offers to sell.

In some embodiment, the displaying the at least one second option to select the first range of monetary amounts that the at least one first potential buyer agrees to pay for the at least one first item further includes: identifying each range of monetary amounts in a plurality of ranges of monetary amounts based on likelihood that the at least one first seller accepts the at least one first buyer offer or the at least one second buyer offer.

In some embodiment, the displaying the at least one second option to select the first range of monetary amounts that the at least one first potential buyer agrees to pay for the at least one first item further includes: varying a number of displayed ranges in a plurality of ranges of monetary amounts based on at least one monetary fee received from the at least one first potential buyer.

In some embodiment, the computer-implemented method further includes: changing, by the computer system, from the at least one first seller, the first MAPR when the at least on first seller receives no offers that matches the first MAPR after a pre-determine time period.

In some embodiment, the computer-implemented method further includes: varying, by the computer system, a number of the first MANBCs based on at least one monetary fee received from the at least one first potential buyer. In some embodiment, the computer-implemented method further includes: increasing, by the computer system, the at least one monetary fee for buyer offer subsequent to the at least one first buyer offer. In some embodiment, the computer-implemented method further includes: increasing, by the computer system, the at least one monetary fee for buyer offer subsequent to the at least one second buyer offer.

In some embodiment, the at least one first seller is a hotel and the at least one first item is a room in the hotel. In some embodiment, the computer-implemented method further includes: dynamically adjusting, by the computer system, at least one of the first MAP, the first MAPR, and the first MANBCs, based a plurality of:
  a) a date of booking;
  b) a date of check-in;
  c) days ahead of arrival;
  d) room availability;
  e) allotment booked;
  f) occupancy level;
  g) a total cost of the at least one first sale transaction;
  h) times applied;
  i) demand for at least one first identifying characteristic of the room;
  j) at least one market characteristics of a market where the at least one first potential buyer is geographically located;
  k) customer ID profile of the at least one first potential buyer;
  l) at least one calendar date of stay;
  m) a date of arrival;
  n) a date of departure;
  o) a length of stay;
  p) a desired number of rooms;
  q) a number of guests; and
  r) a PAX combinations.

In some embodiments, the instant invention further provides a programmed computer system that includes at least the following parts: a non-transient memory having at least one region for storing computer executable program code; and at least one processor for executing the program code stored in the memory, wherein the program code that at least includes: code to receive, from at least one first seller, first seller information for at least one first item that the at least one first seller offers to sell; code to determine, from the seller information at least the following conditions for the at least one first item: i) a plurality of first identifying characteristics that specifically describe the at least one first item and specifically identify the at least one first seller; ii) a first Minimum Acceptable Price (a first MAP) that the at least one first seller is willing to accept and a first Minimum Acceptable Price Range (a first MAPR) within which the at least one first seller desires to receive at least one first offer to buy the at least one first item, and iii) a first Maximum Allowable Number of Negotiating Chances (a first MANBCs) per each buyer; code to display, to at least one first potential buyer, on a screen of a computer device, the plurality of first identifying characteristics of the at least one first item and at least one of: i) at least one first option to enter a first monetary amount that the at least one first potential buyer agrees to pay for the at least one first item, or ii) at least one second option to select a first range of monetary amounts that the at least one first potential buyer agrees to pay for the at least one first item; code to receive, from the at least one first potential buyer, at least one first buyer offer for the at least one first item; code to consummate at least one first sale transaction when: i) the first monetary amount or the first range of monetary amounts of the at least one first buyer offer for the at least one first item respectively matches the first MAP or the first MAPR, and ii) the at least one first potential buyer has not previously submitted at least one other offer for the at least one first item so that a total number of offers made by the at least one first potential buyer is equal or less than the first MANBCs, wherein the total number of offers made by the at least one first potential buyer is a count of the at least one first buyer offer and the at least one other offer that the at least one first potential buyer submitted for the at lest one first item; and code to enable, the at least one first potential buyer to submit at least one second buyer offer for the at least one first item when: i) the monetary amount or range of monetary amounts of the at least one first buyer offer for the at least one first item do not respectively match the first MAP or the first MAPR, and ii) the at least one first potential buyer has not previously submitted the at least one other offer for the at least one first item so that the total number of offers made by the at least one first potential buyer is equal or less than the first MANBCs, wherein the total number of offers made by the at least one first potential buyer is a count of the at least one first buyer offer and the at least one other offer that the at least one first potential buyer submitted for the at least one first item.

In some embodiments, the instant invention further provides yet another computer-implemented method that at least includes steps of: displaying, by a computer device of at least one first potential buyer, a plurality of first identifying characteristics of at least one first item and at least one of: i) at least one first option to enter a first monetary amount that the at least one first potential buyer agrees to pay for the at least one first item, or ii) at least one second option to select a first range of monetary amounts that the at least one first potential buyer agrees to pay for the at least one first item, wherein the plurality of first identifying characteristics of the at least one first item specifically describe the at least one first item and specifically identify at least one first seller, and wherein the plurality of first identifying characteristics of the at least one first item are based on first seller information for at least one first item that the at least one first seller offers to sell; submitting, by the computer device of at least one first potential buyer, from the at least one first potential buyer, at least one first buyer offer for the at least one first item, wherein the at least one first buyer offer for the at least one first item cause to consummate at least one first sale transaction when: i) a first monetary amount or a first range of monetary amounts of the at least one first buyer offer for the at least one first item respectively matches a first Minimum Acceptable Price (a first MAP) that the at least one first seller is willing to accept or a first Minimum Acceptable Price Range (a first MAPR) within which the at least one first seller desires to receive offers to buy the at least one first item, and ii) the at least one first potential buyer has not previously submitted at least one other offer for the at least one first item so that a total number of offers made by the at least one first potential buyer is equal or less than a first Maximum Allowable Number of Negotiating Chances (a first MANBCs), wherein the total number of offers made by the at least one first potential buyer is a count of the at least one first buyer offer and the at least one other offer that the at least one first potential buyer submitted for the at lest one first item; and submitting, by the computer device of at least one first potential buyer, from the at least one first potential buyer, at least one second buyer offer for the at least one first item when: i) the monetary amount or range of monetary amounts of the at least one first buyer offer for the at least one first item do not respectively match the first MAP or the first MAPR, and ii) the at least one first potential buyer has not previously submitted the at least one other offer for the at least one first item so that the total number of offers made by the at least one first potential buyer is equal or less than the first MANBCs, wherein the total number of offers made by the at least one first potential buyer is a count of the at least one first buyer offer and the at least one other offer that the at least one first potential buyer submitted for the at least one first item.

Of note, the embodiments described herein may, of course, be implemented using any appropriate computer system hardware and/or computer system software. In this regard, those of ordinary skill in the art are well versed in the type of computer hardware that may be used (e.g., a mainframe, a mini-computer, a personal computer ("PC"), a network (e.g., an intranet and/or the internet)), the type of computer programming techniques that may be used (e.g., object oriented programming), and the type of computer programming languages that may be used (e.g., C++, Basic, AJAX, Javascript). The aforementioned examples are, of course, illustrative and not restrictive.

While a number of embodiments of the present invention have been described, it is understood that these embodiments are illustrative only, and not restrictive, and that many modifications may become apparent to those of ordinary skill in the art. Further still, the various steps may be carried out in any desired order (and any desired steps may be added and/or any desired steps may be eliminated).

What is claimed is:

1. A computer-implemented method, comprising:
  programming at least one computer system to perform at least the steps of:
  receiving, by a computer system, from at least one first seller, first seller information for at least one first item that the at least one first seller offers to sell;
  determining, by the computer system, from the seller information at least the following conditions for the at least one first item:
    i) a plurality of first identifying characteristics that specifically describe the at least one first item and specifically identify the at least one first seller;
    ii) a first Minimum Acceptable Price (a first MAP) that the at least one first seller is willing to accept and a first Minimum Acceptable Price Range (a first MAPR) within which the at least one first seller desires to receive at least one first offer to buy the at least one first item, and
    iii) a first Maximum Allowable Number of Negotiating Chances (a first MANBCs) per each buyer;
  displaying, by the computer system, to at least one first potential buyer, on a screen of a computer device, the plurality of first identifying characteristics of the at least one first item and at least one of:
    i) at least one first option to enter a first monetary amount that the at least one first potential buyer agrees to pay for the at least one first item, or
    ii) at least one second option to select a first range of monetary amounts that the at least one first potential buyer agrees to pay for the at least one first item;
  receiving, by the computer system, from the at least one first potential buyer, at least one first buyer offer for the at least one first item;
  consummating, by the computer system, at least one first sale transaction when:
    i) the first monetary amount or the first range of monetary amounts of the at least one first buyer offer for the at least one first item respectively matches the first MAP or the first MAPR, and ii) the at least one first potential buyer has not previously submitted at least one other offer for the at least one first item so that a total number of offers made by the at least one first potential buyer is equal or less than the first MANBCs, wherein the total number of offers made by the at least one first potential buyer is a count of the at least one first buyer offer and the at least one other offer that the at least one first potential buyer submitted for the at lest one first item; and enabling, by the computer system, the at least one first potential buyer to submit at least one second buyer offer for the at least one first item when:

i) the monetary amount or range of monetary amounts of the at least one first buyer offer for the at least one first item do not respectively match the first MAP or the first MAPR, and ii) the at least one first potential buyer has not previously submitted the at least one other offer for the at least one first item so that the total number of offers made by the at least one first potential buyer is equal or less than the first MANBCs, wherein the total number of offers made by the at least one first potential buyer is a count of the at least one first buyer offer and the at least one other offer that the at least one first potential buyer submitted for the at least one first item.

2. The computer-implemented method of claim 1, wherein the at least one item is at least one first product or at least one first service that the at least one first seller offers to sell.

3. The computer-implemented method of claim 1, wherein the displaying the at least one second option to select the first range of monetary amounts that the at least one first potential buyer agrees to pay for the at least one first item further comprises:

identifying each range of monetary amounts in a plurality of ranges of monetary amounts based on likelihood that the at least one first seller accepts the at least one first buyer offer or the at least one second buyer offer.

4. The computer-implemented method of claim 1, wherein the computer-implemented method further comprises:

changing, by the computer system, from the at least one first seller, the first MAPR when the at least on first seller receives no offers that matches the first MAPR after a pre-determine time period.

5. The computer-implemented method of claim 1, wherein the computer-implemented method further comprises:

varying, by the computer system, a number of the first MANBCs based on at least one monetary fee received from the at least one first potential buyer.

6. The computer-implemented method of claim 5, wherein the computer-implemented method further comprises:

increasing, by the computer system, the at least one monetary fee for buyer offer subsequent to the at least one first buyer offer.

7. The computer-implemented method of claim 5, wherein the computer-implemented method further comprises:

increasing, by the computer system, the at least one monetary fee for buyer offer subsequent to the at least one second buyer offer.

8. The computer-implemented method of claim 1, wherein the at least one first seller is a hotel and the at least one first item is a room in the hotel.

9. The computer-implemented method of claim 8, wherein the computer-implemented method further comprises:

dynamically adjusting, by the computer system, at least one of the first MAP, the first MAPR, and the first MANBCs, based a plurality of:

a) a date of booking;
b) a date of check-in;
c) days ahead of arrival;
d) room availability;
e) allotment booked;
f) occupancy level;
g) a total cost of the at least one first sale transaction;
h) times applied;
i) demand for at least one first identifying characteristic of the room;
j) at least one market characteristics of a market where the at least one first potential buyer is geographically located;
k) customer ID profile of the at least one first potential buyer;
l) at least one calendar date of stay;
m) a date of arrival;
n) a date of departure;
o) a length of stay;
p) a desired number of rooms;
q) a number of guests; and
r) a PAX combinations.

10. A programmed computer system, comprising:

a non-transient memory having at least one region for storing computer executable program code; and at least one processor for executing the program code stored in the memory, wherein the program code comprises:

code to receive, from at least one first seller, first seller information for at least one first item that the at least one first seller offers to sell;

code to determine, from the seller information at least the following conditions for the at least one first item:

i) a plurality of first identifying characteristics that specifically describe the at least one first item and specifically identify the at least one first seller;

ii) a first Minimum Acceptable Price (a first MAP) that the at least one first seller is willing to accept and a first Minimum Acceptable Price Range (a first MAPR) within which the at least one first seller desires to receive at least one first offer to buy the at least one first item, and iii) a first Maximum Allowable Number of Negotiating Chances (a first MANBCs) per each buyer;

code to display, to at least one first potential buyer, on a screen of a computer device, the plurality of first identifying characteristics of the at least one first item and at least one of:

i) at least one first option to enter a first monetary amount that the at least one first potential buyer agrees to pay for the at least one first item, or ii) at least one second option to select a first range of monetary amounts that the at least one first potential buyer agrees to pay for the at least one first item;

code to receive, from the at least one first potential buyer, at least one first buyer offer for the at least one first item;

code to consummate at least one first sale transaction when:

i) the first monetary amount or the first range of monetary amounts of the at least one first buyer offer for the at least one first item respectively matches the first MAP or the first MAPR, and ii) the at least one first potential buyer has not previously submitted at least one other offer for the at least one first item so that a total number of offers made by the at least one first potential buyer is equal or less than the first MANBCs, wherein the total number of offers made by the at least one first potential buyer is a count of the at least one first buyer offer and the at least one other offer that the at least one first potential buyer submitted for the at lest one first item; and code to enable, the at least one first potential buyer to submit at least one second buyer offer for the at least one first item when:
  i) the monetary amount or range of monetary amounts of the at least one first buyer offer for the at least one first item do not respectively match the first MAP or the first MAPR, and
  ii) the at least one first potential buyer has not previously submitted the at least one other offer for the at least one first item so that the total number of offers made by the at least one first potential buyer is equal or less than the first MANBCs, wherein the total number of offers made by the at least one first potential buyer is a count of the at least one first buyer offer and the at least one other offer that the at least one first potential buyer submitted for the at least one first item.

11. The programmed computer system of claim 10, wherein the at least one item is at least one first product or at least one first service that the at least one first seller offers to sell.

12. The programmed computer system of claim 10, wherein the code to display the at least one second option to select the first range of monetary amounts that the at least one first potential buyer agrees to pay for the at least one first item further comprises:
  code to identify each range of monetary amounts in a plurality of ranges of monetary amounts based on likelihood that the at least one first seller accepts the at least one first buyer offer or the at least one second buyer offer.

13. The programmed computer system of claim 10, wherein the programmed computer system further comprises:
  code to enable the at least one first seller to change the first MAPR when the at least on first seller receives no offers that matches the first MAPR after a pre-determine time period.

14. The programmed computer system of claim 10, wherein the programmed computer system further comprises:
  code to vary a number of the first MANBCs based on at least one monetary fee received from the at least one first potential buyer.

15. The programmed computer system of claim 14, wherein the programmed computer system further comprises:
  code to increase the at least one monetary fee for buyer offer subsequent to the at least one first buyer offer.

16. The programmed computer system of claim 14, wherein the programmed computer system further comprises:
  code to increase the at least one monetary fee for buyer offer subsequent to the at least one second buyer offer.

17. The programmed computer system of claim 10, wherein the at least one first seller is a hotel and the at least one first item is a room in the hotel.

18. The programmed computer system of claim 17, wherein the programmed computer system further comprises:
  code to dynamically adjust at least one of the first MAP, the first MAPR, and the first MANBCs, based a plurality of:
  a) a date of booking;
  b) a date of check-in;
  c) days ahead of arrival;
  d) room availability;
  e) allotment booked;
  f) occupancy level;
  g) a total cost of the at least one first sale transaction;
  h) times applied;
  i) demand for at least one first identifying characteristic of the room;
  j) at least one market characteristics of a market where the at least one first potential buyer is geographically located;
  k) customer ID profile of the at least one first potential buyer;
  l) at least one calendar date of stay;
  m) a date of arrival;
  n) a date of departure;
  o) a length of stay;
  p) a desired number of rooms;
  q) a number of guests; and
  r) a PAX combinations.

19. A computer-implemented method, comprising:
  displaying, by a computer device of at least one first potential buyer, a plurality of first identifying characteristics of at least one first item and at least one of:
  i) at least one first option to enter a first monetary amount that the at least one first potential buyer agrees to pay for the at least one first item, or
  ii) at least one second option to select a first range of monetary amounts that the at least one first potential buyer agrees to pay for the at least one first item, wherein the plurality of first identifying characteristics of the at least one first item specifically describe the at least one first item and specifically identify at least one first seller, and
  wherein the plurality of first identifying characteristics of the at least one first item are based on first seller information for at least one first item that the at least one first seller offers to sell;
  submitting, by the computer device of at least one first potential buyer, from the at least one first potential buyer, at least one first buyer offer for the at least one first item, wherein the at least one first buyer offer for the at least one first item cause to consummate at least one first sale transaction when:
  i) a first monetary amount or a first range of monetary amounts of the at least one first buyer offer for the at least one first item respectively matches a first Minimum Acceptable Price (a first MAP) that the at least one first seller is willing to accept or a first Minimum Acceptable Price Range (a first MAPR) within which the at least one first seller desires to receive offers to buy the at least one first item, and
  and
  ii) the at least one first potential buyer has not previously submitted at least one other offer for the at least one first item so that a total number of offers made by the at least one first potential buyer is equal or less than a first Maximum Allowable Number of Negotiating Chances (a first MANBCs), wherein the total number of offers made by the at least one first potential buyer is a count of the at least one first buyer offer and the at least one other offer that the at least one first potential buyer submitted for the at lest one first item; and
  submitting, by the computer device of at least one first potential buyer, from the at least one first potential buyer, at least one second buyer offer for the at least one first item when:
  i) the monetary amount or range of monetary amounts of the at least one first buyer offer for the at least one first item do not respectively match the first MAP or the first MAPR, and ii) the at least one first potential buyer has not previously submitted the at least one other offer for the at least one first item so that the total number of offers made by the at least one first potential buyer is equal or less than the first MANBCs, wherein the total number of offers made by the at least one first potential buyer is a count of the at least one first buyer offer and the at least one other offer that the at least one first potential buyer submitted for the at least one first item.

20. The computer-implemented method of claim 19, wherein the at least one item is at least one first product or at least one first service that the at least one first seller offers to sell.

21. The computer-implemented method of claim 19, wherein the displaying the at least one second option to select the first range of monetary amounts that the at least one first potential buyer agrees to pay for the at least one first item further comprises:
    identifying each range of monetary amounts in a plurality of ranges of monetary amounts based on likelihood that the at least one first seller accepts the at least one first buyer offer or the at least one second buyer offer.

22. The computer-implemented method of claim 19, wherein the computer-implemented method further comprises:
    changing, by the computer system, from the at least one first seller, the first MAPR when the at least on first seller receives no offers that matches the first MAPR after a pre-determine time period.

23. The computer-implemented method of claim 19, wherein the computer-implemented method further comprises:
    varying, by the computer system, a number of the first MANBCs based on at least one monetary fee received from the at least one first potential buyer.

24. The computer-implemented method of claim 23, wherein the computer-implemented method further comprises:
    increasing, by the computer system, the at least one monetary fee for buyer offer subsequent to the at least one first buyer offer.

25. The computer-implemented method of claim 23, wherein the computer-implemented method further comprises:
    increasing, by the computer system, the at least one monetary fee for buyer offer subsequent to the at least one second buyer offer.

26. The computer-implemented method of claim 19, wherein the at least one first seller is a hotel and the at least one first item is a room in the hotel.

27. The computer-implemented method of claim 26, wherein the computer-implemented method further comprises:
    dynamically adjusting, by the computer system, at least one of the first MAP, the first MAPR, and the first MANBCs, based a plurality of:
    a) a date of booking;
    b) a date of check-in;
    c) days ahead of arrival;
    d) room availability;
    e) allotment booked;
    f) occupancy level;
    g) a total cost of the at least one first sale transaction;
    h) times applied;
    i) demand for at least one first identifying characteristic of the room;
    j) at least one market characteristics of a market where the at least one first potential buyer is geographically located;
    k) customer ID profile of the at least one first potential buyer;
    l) at least one calendar date of stay;
    m) a date of arrival;
    n) a date of departure;
    o) a length of stay;
    p) a desired number of rooms;
    q) a number of guests; and
    r) a PAX combinations.

* * * * *